Jan. 19, 1960 A. KOWATSCH ET AL 2,921,662
MOTOR OPERATED ERASER FOR ELECTRIC TYPEWRITERS
Filed Oct. 28, 1958

INVENTORS
ALBIN KOWATSCH
HANS LARWIN

BY *Kenyon & Kenyon*

ATTORNEYS

United States Patent Office 2,921,662
Patented Jan. 19, 1960

2,921,662

MOTOR OPERATED ERASER FOR ELECTRIC TYPEWRITERS

Albin Kowatsch and Hans Larwin, Innsbruck, Austria

Application October 28, 1958, Serial No. 770,124

Claims priority, application Austria October 28, 1957

5 Claims. (Cl. 197—181)

The present invention relates to motor operated erasers for electric typewriters.

The known power operated erasers heretofore embodied in electric typewriters were usually driven through a flexible shaft. These devices required a mechanical clutch for coupling the shaft to the motor of the typewriter, whereby they were expensive to be manufactured and not easy to be handled. Moreover, while using the eraser the accidental depression of a key of the typewriter keyboard could damage the paper, whereby the eraser had to be handled most carefully.

Independent motor operated erasers are generally known, which are easy to be handled but which as yet have not been embodied into an electric typewriter.

An object of the present invention is to provide a motor operated typewriter embodying a motor operated eraser.

A more specific object is to provide in an electric typewriter a motor operated eraser adapted while being used to prevent accidental operation of the typewriter.

According to the invention, in a motor operated typewriter embodying a motor operated eraser we now provide a housing for said eraser and means controlled by said eraser upon being removed from and returned into said housing for alternately conditioning said typewriter motor and said eraser motor for operation.

Further objects, features and advantages of the invention will become apparent from the following description, taken in conjunction with the accompanying drawings wherein.

Figure 1:
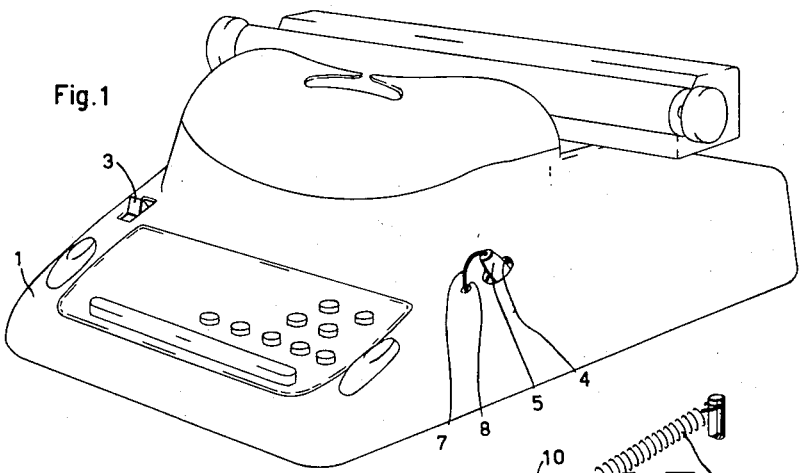
Fig. 1 is a perspective view of an electric typewriter embodying the eraser according to the invention.
Figure 3:
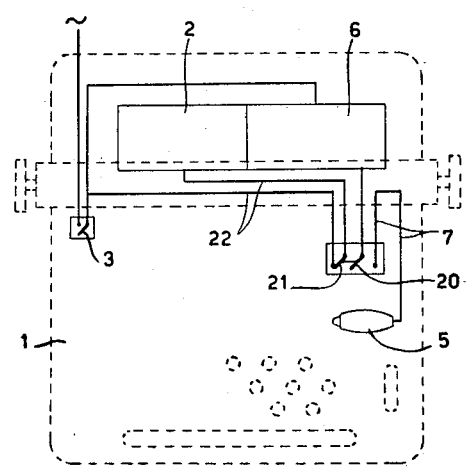

Fig. 3 diagrammatically represents the electric connections of the machine of Fig. 1.

With reference to the drawings, the numeral 1 generically indicates a motor operated typewriter, such as a conventional electric typewriter operated by an electric motor 2 (Fig. 3) fed by a power source, such as the network 23, through a switch 3.

The casing of the machine 1 is provided with a suitable recess or hole 4 (Fig. 1) forming a housing adapted to normally receive a motor operated eraser 5, known per se. More specifically, the eraser 5 comprises a rubber rotated at high speed by an independent electric motor incorporated into the eraser. A flexible elongated member formed of an electric cable 7 is provided between the eraser motor and a transformer 6 fed by the power source feeding the typewriter motor 2. The cable 7 passes through a hole 8 provided in the casing of the typewriter.

Within the casing of the typewriter the cable 7 is connected to a commutator such as a switch 12 secured to the machine frame, and is guided by two stationary guiding means such as the pulleys 9 and 11 fulcrumed on a stationary part of the machine frame, and by a shiftable guiding means such as the pulley 10 fulcrumed on a shiftable element such as a slide 13 sliding on a stationary rail 14.

The slide 13 is normally so urged by a spring 15 as to be moved away from the pulleys 9 and 11, whereby the cable 7 is normally withdrawn within the casing of the typewriter. To this end the length of the rail 14 should be approximately half as long as the cable length required by the eraser for being used on the paper carriage upon being removed from the housing 4.

The slide 13 is formed with a projection 16 adapted to cooperate with a pair of arms 17 and 18 of a commutating lever 19 provided on the switch 12.

As will be described hereinafter, the switch 12 is controlled by the eraser 5 upon being removed from and returned into the housing 4 for alternately conditioning the typewriter motor 2 and the eraser motor for operation. More particularly, this switch comprises a pair of contacts 20 and 21 adapted to be simultaneously operated by the lever 19, in a manner known per se and not shown in the drawings. The contact 20 is connected to the transformer 6 and is normally disconnected from the cable 7, while the contact 21 is connected to the general switch 3 and normally closes the circuit 22 of the motor 2.

Figure 2:
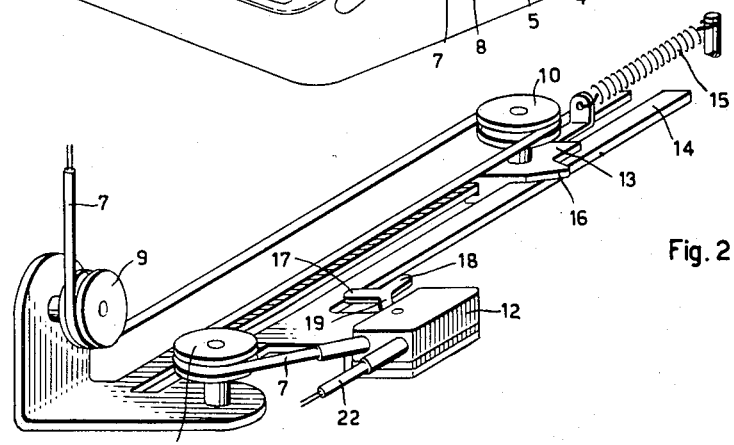
Fig. 2 is a perspective view of a detail of the machine of Fig. 1.

If the typist desires to erase an incorrectly typewritten letter or sign, she will remove the eraser 5 from the housing 4 and pull the cable 7 of the casing of the typewriter. The cable 7 will thus shift the slide 13 (Fig. 2) along the rail 14 against the urge of the spring 15.

When the projection 16 of the slide 13 engages the arm 17, the lever 19 is swung counterclockwise and operates the switch 12. The contact 21 will open the circuit 22 of the typewriter motor 2, thus preventing the typewriter from being accidentally operated, and simultaneously the contact 20 will close the circuit of the motor of the eraser 5, thus conditioning same for operation.

When the erasing operation is completed, the typist merely returns the eraser 5 into the housing 4. The slide 13 is returned to rest by the urge of spring 15 and the projection 16 when engaging the arm 18 of the lever 19 will swing the latter clockwise and restore the switch 12 to its initial condition. Therefore, the typewriter motor 2 will again be conditioned for operation while the circuit of the eraser motor will be opened. Furthermore, the slide 13 returns the cable 7 within the casing of the typewriter.

It will thus be apparent that the cable 7 is adapted to operate the switch 12 for alternately connecting the power source 23 to the typewriter motor 2 and to the eraser motor upon moving the eraser 5 to and fro with respect to the housing 4.

It is to be understood that the form of the invention herewith shown and described is to be taken as a preferred example of the same, and that, in accordance with the various types of erasers and of electric typewriter wherein the device may be incorporated, various changes in shape, size and arrangement of parts, may be resorted to, without departing from the spirit of the invention, or the scope of the subjoined claims.

What we claim is:

1. In a typewriter embodying an eraser, a typewriter motor adapted to operate said typewriter, an eraser motor adapted to operate said eraser, a housing for said eraser, and means controlled by said eraser upon being removed from and returned into said housing for alternately conditioning said typewriter motor and said eraser motor for operation.

2. In a typewriter embodying an eraser, a typewriter motor adapted to operate said typewriter, an eraser motor adapted to operate said eraser, a power source for feeding both said typewriter motor and said eraser motor, a housing for said eraser, a flexible elongated member between said eraser motor and said power source, and a commutator operable by said member for alternately connecting said power source to said typewriter motor and to said eraser motor upon moving said eraser to and fro with respect to said housing.

3. In a typewriter embodying an eraser, a typewriter motor adapted to operate said typewriter, an eraser motor adapted to operate said eraser, a power source for feeding both said typewriter motor and said eraser motor, a housing for said eraser, a flexible elongated member between said eraser motor and said power source, a commutator operable for alternately connecting said power source to said typewriter motor and to said eraser motor, shiftable guiding means for said member, said member being adapted to shift said guiding means upon moving said eraser to and fro with respect to said housing, and means controlled by said guiding means upon being shifted for operating said commutator.

4. In a typewriter as defined in claim 3, a casing, a frame, means for reciprocably mounting said guiding means on said frame, and a spring normally urging said mounting means to withdraw said flexible member within said casing.

5. In a typewriter having a casing and embodying an eraser, a typewriter motor adapted to operate said typewriter, an eraser motor adapted to operate said eraser, a recess on said casing for normally containing said eraser, an electric cable for feeding said eraser motor, an operable commutator comprising a normally open contact inserted in the circuit of the eraser motor and a normally closed contact inserted in the circuit of the typewriter motor, shiftable guiding means for said cable adapted to operate said commutator for simultaneously closing said open contact and opening said closed contact upon removing said eraser from said recess, and a spring urging said guiding means to pull said cable into said casing.

No references cited.